(12) United States Patent
Tahk

(10) Patent No.: US 12,358,654 B1
(45) Date of Patent: Jul. 15, 2025

(54) RING-SYNCHRONIZED SEPARATION ADAPTER FOR SEPARATING PAYLOAD IN SPACE ENVIRONMENT

(71) Applicant: SpaceBey Inc., Daejeon (KR)

(72) Inventor: Gyung Mo Tahk, Seoul (KR)

(*) Notice: Subject to any disclaimer, the term of this patent is extended or adjusted under 35 U.S.C. 154(b) by 0 days.

(21) Appl. No.: 18/766,455

(22) Filed: Jul. 8, 2024

(51) Int. Cl.
*B64G 1/64* (2006.01)

(52) U.S. Cl.
CPC ............. *B64G 1/642* (2023.08); *B64G 1/645* (2013.01)

(58) Field of Classification Search
CPC ........ B64G 1/643; B64G 1/641; B64G 1/644; B64G 1/64; B64G 1/002; B64G 1/642; B64G 1/645; F16B 7/042; F16B 7/0413; F16B 15/36
See application file for complete search history.

(56) References Cited

U.S. PATENT DOCUMENTS

| | | | | |
|---|---|---|---|---|
| 7,543,779 B1* | 6/2009 | Lewis | ............. | B64G 1/6462 244/172.4 |
| 8,979,035 B2* | 3/2015 | Straumann | ............. | B64G 1/645 244/173.1 |
| 11,702,230 B2* | 7/2023 | Dharmaraj | ............. | B64G 1/6462 244/172.4 |
| 2024/0228070 A1* | 7/2024 | Kuehn | ............. | B64G 1/645 |

* cited by examiner

*Primary Examiner* — Joshua D Huson
*Assistant Examiner* — Vicente Rodriguez
(74) *Attorney, Agent, or Firm* — Youngil Lee

(57) ABSTRACT

The present invention relates to a ring-synchronized separation adapter for separating a payload in a space environment, and more specifically, to a ring-synchronized separation adapter for separating a payload in space environment, in which the ring-synchronized separation adapter has a configuration in which a plurality of segmented clamp portions are simultaneously fastened or unfastened by rotating a drive member making contact with all of the plurality of segmented clamp portions, so that accuracy in separation of the payload is improved, explosion is not utilized, and stability of the ring-synchronized separation adapter is improved as a whole.

10 Claims, 11 Drawing Sheets

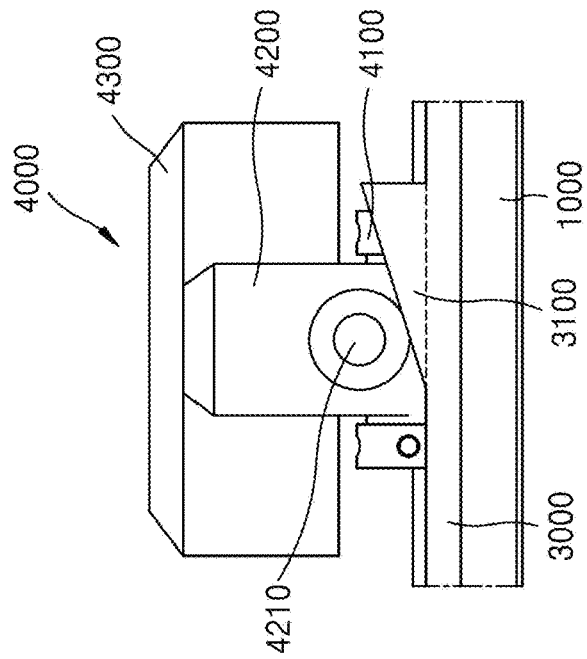
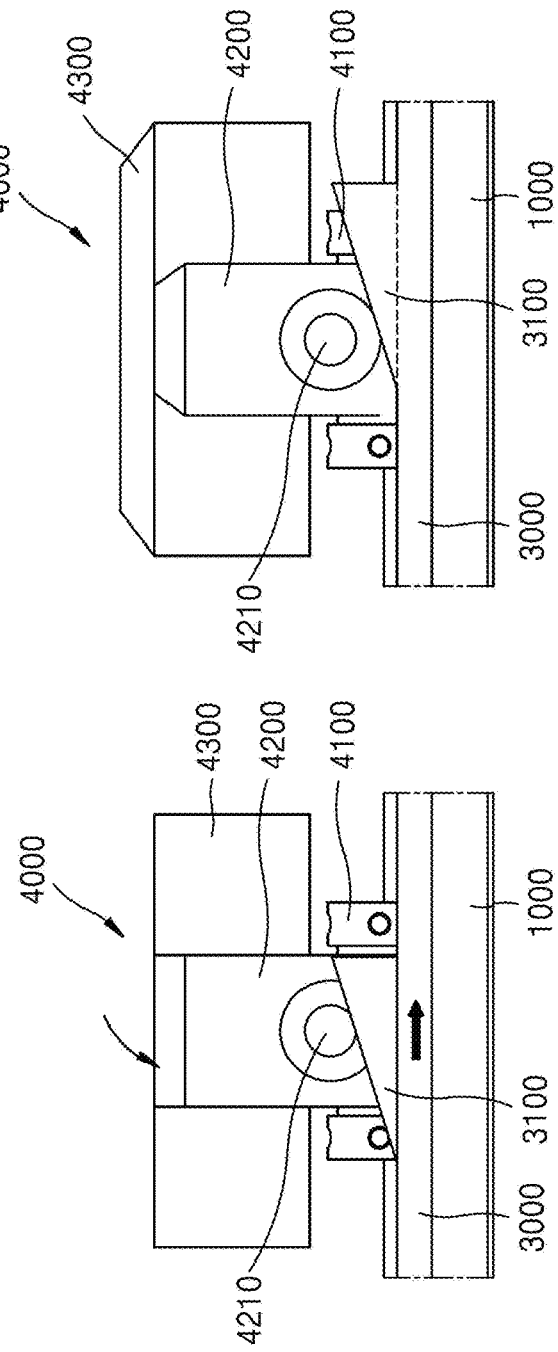

RING-SYNCHRONIZED SEPARATION ADAPTER FOR SEPARATING PAYLOAD IN SPACE ENVIRONMENT

BACKGROUND OF THE INVENTION

1. Field of the Invention

The present invention relates to a ring-synchronized separation adapter for separating a payload in a space environment, and more specifically, to a ring-synchronized separation adapter for separating a payload in a space environment, in which the ring-synchronized separation adapter has a configuration in which a plurality of segmented clamp portions are simultaneously fastened or released by rotating a drive member making contact with all of the plurality of segmented clamp portions, so that accuracy in separation of the payload is improved, explosion is not utilized, and stability of the ring-synchronized separation adapter is improved as a whole.

2. Description of the Related Art

In a space exploration mission, separation structures of a payload, such as a small satellite, are essential to safely fix the payload to a projectile and safely and easily separate the payload from the projectile at a desired time. Conventionally, as one of the separation structures of the payload, an explosive separation structure in which bolts are fastened to the payload and the projectile and the bolts are cut using explosives at an appropriate timing has been generally applied.

However, in such an explosive separation structure, the number of bolts needs to be kept to a minimum, and thus a heavy load may be generated on each bolt, and such a load deteriorates durability and reliability of the bolt. Further, the explosive separation structure may exert a significant impact on the projectile and the payload, and thus it is difficult to apply the explosive separation structure to a fragile payload such as a satellite, and there is a risk of explosion during assembly and test.

In particular, the payload is generally connected at a plurality of points, and in order to accurately and stably separate the payload, the payload needs to be simultaneously separated at the plurality of points. The conventional explosive separation structure has a problem in that it is technically complicated and has a high possibility of failure because the conventional explosive separation structure has to control the explosion to simultaneously occur at the plurality of points.

That is, there is a need to develop a separation structure of the payload, which secures stability of the payload and the projectile and eliminates uncertainty due to explosion to enable more accurate control.

SUMMARY OF THE INVENTION

An object of the present invention is to provide a ring-synchronized separation adapter for separating a payload in a space environment, in which the ring-synchronized separation adapter has a configuration in which a plurality of segmented clamp portions are simultaneously fastened or released by rotating a drive member making contact with all of the plurality of segmented clamp portions, so that accuracy in separation of the payload is improved, explosion is not utilized, and stability of the ring-synchronized separation adapter is improved as a whole.

To solve the above problems, one embodiment of the present invention provides a separation adapter for separating a payload from a projectile in a space environment, in which the separation adapter includes: a lower ring coupled to the projectile; an upper ring coupled to the payload; a drive member rotatably coupled to an upper surface of the lower ring along a rim of the lower ring; and a plurality of clamp portions, each of which is fixed to the upper surface of the lower ring and located inward of the drive member and in which a part of the drive member makes contact with an outside of the clamp portion and a rim of the upper ring is fastened to an inside of the clamp portion, in which as the drive member rotates, the plurality of clamp portions are simultaneously switched from a first state to a second state, the first state is a state in which a force is applied to each of the clamp portions in an inward direction of the lower ring by the part of the drive member, and the second state is a state in which the force applied to each of the clamp portions in the inward direction of the lower ring is released by the part of the drive member.

According to some embodiments of the present invention, in the separation adapter, in a state where the rim of the upper ring is fastened to the inside of the plurality of clamp portions, the drive member may rotate along the rim of the lower ring, so that the part of the drive member may move along the rim of the lower ring, the part of the drive member may move along the rim of the lower ring, so that the plurality of clamp portions may be simultaneously switched from the first state to the second state, and the plurality of clamp portions are simultaneously switched from the first state to the second state, fastening between the plurality of clamp portions and the rim of the upper ring may be released, so that the upper ring may be separated from the lower ring.

According to some embodiments of the present invention, the drive member may include: a plurality of stoppers, each of which protrudes in a height direction from an upper surface of the drive member, and has an inclined surface formed on an upper side thereof as a height of the stopper gradually decreases from one side to the other side, when the plurality of clamp portions are in the first state, a part of each of the clamp portions may make contact with one side of the inclined surface of each of the stoppers, and when the plurality of clamp portions are in the second state, the part of each of the clamp portions may make contact with the other side of the inclined surface of each of the stoppers.

According to some embodiments of the present invention, each of the clamp portions may include: a clamp holder portion fixed to the upper surface of the lower ring; a clamp body portion having a lower portion rotatably coupled to the clamp holder portion and an outside in which the part of the drive member makes contact an outer portion of the clamp body portion; and a clamp fastening portion coupled to an inner upper portion of the clamp body portion and including a fastening groove portion which is concavely recessed such that the rim of the upper ring is fastened thereto.

According to some embodiments of the present invention, the clamp body portion may further include a contact protruding portion protruding in a direction perpendicular to an outer surface of the clamp body portion, and having a cylindrical shape as a whole so that an outer circumferential surface of the contact protruding portion makes line-contact with the part of the drive member.

According to some embodiments of the present invention, each of the clamp portions further may include: a torsion spring portion disposed inside the clamp holder portion, having one end connected to the lower portion of the clamp body portion, and configured to apply a force in an outward direction of the lower ring to the clamp body portion, when the plurality of clamp portions are in the first state, the clamp body portion may be applied with a force in the inward direction of the lower ring by the part of the drive member, and when the plurality of clamp portions are in the second state, the clamp body portion may be widened in an outward direction of the lower ring by the torsion spring portion.

According to some embodiments of the present invention, the clamp holder portion may further include torsion adjusting portions rotatably disposed at both end sides of the clamp holder portion, respectively, in which one side torsion adjusting portion is exposed to an outside of the clamp holder portion and the other side of the torsion adjusting portion is connected to the other end of the torsion spring portion, and as the torsion adjusting portion rotates about a shaft, the other end of the torsion spring portion may rotate, and as the other end of the torsion spring portion rotates, a torsion of the torsion spring portion may be adjusted.

According to some embodiments of the present invention, the separation adapter may further include a ring guide portion configured to guide the drive member such that the drive member rotates along the rim of the lower ring, in which the ring guide portion may include: a vertical ring guide portion including a plurality of first ring guides, each of which has a roll shape as a whole, is rotatably connected to the upper surface of the lower ring about a shaft, and makes contact with an inner circumferential surface of the drive member; and a horizontal guide portion including: a plurality of guide fixing members, each of which has a block shape as a whole, is disposed on the upper surface of the lower ring, and is located inward of the drive member; and a plurality of second ring guides, each of which is rotatably connected to the outer surface of each of the plurality of guide fixing members about a shaft and makes contract with the upper surface of the drive member.

According to some embodiments of the present invention, the separation adapter may further include an upper ring support configured to support the upper ring, in which the upper ring support may include: an upper end flange having a shape corresponding to the lower surface of the upper ring as a whole; a flange fixing portion coupled to the upper surface of the lower ring while extending downward from the upper end flange; and a module accommodating portion coupled to the upper surface of the lower ring while extending downward from the upper end flange, and forming an internal space.

According to some embodiments of the present invention, the separation adapter may further include a plurality of kick-off modules configured to transmit a force to the lower surface of the upper ring in an upward direction, in which each of the kick-off modules may include: a kick-off column portion having a column shape as a whole and having a lower end fixed to the upper surface of the lower ring; a kick-off tube portion including: a tube body having a hollow tube shape as a whole and configured to accommodate the kick-off column portion therein; a tube flange coupled to an upper side of the tube body and having a diameter greater than a diameter of the tube body as a whole; and a contact sensor coupled to an upper side of the tube flange; and a compression spring configured to surround an outer circumferential surface of the kick-off tube portion, when the plurality of clamp portions are in the first state, the compression spring may be compressed downward by the upper ring, and when the plurality of clamp portions are in the second state, the compression spring may apply a force to the upper ring in an upward direction.

According to one embodiment of the present invention, the separation adapter may connect and separate the upper ring to and from the lower ring through a simple process of controlling the fastening between the plurality of clamp portions and the rim of the upper ring, so that it may be easy to connect the payload to the projectile and separate the payload from the projectile.

According to one embodiment of the present invention, the separation adapter applies a ring-synchronized separation structure for simultaneously releasing a fastening state between the plurality of segmented clamp portions and the upper ring, only by rotating the drive member, so that it is possible to achieve safety and improve accuracy in separation of the payload as compared to an adapter to which the conventional explosive separation structure is applied.

According to one embodiment of the present invention, as compared to the conventional explosive separation adapter, the separation adapter of the present invention does not cause breakage due to explosion in a process of connecting the payload to the projectile and a process of separating the payload from the projectile, so that it is possible to reuse the separation adapter.

According to one embodiment of the present invention, the ring guide portion ensures a stable rotational movement and an accurate alignment of the drive member, so that it is possible to improve the operational stability of the payload separation structure.

According to one embodiment of the present invention, since the torsion of the torsion spring portion may be adjusted through an operation of simply rotating the torsion adjusting portion, so that it is possible to control the torsion even without replacing the torsion spring portion.

According to one embodiment of the present invention, the plurality of kick-off modules may assist the upper ring to be separated upward from the lower ring by applying a tensile force to the upper ring in the upward direction, so that it is possible to improve accuracy of separation of the payload.

According to one embodiment of the present invention, a plurality of flange protrusions are formed on the upper surface of the upper end flange, and a plurality of protrusion accommodating portions are formed on the lower surface of the upper ring, so that it is possible to more precisely and firmly fix the upper ring to the upper end flange.

BRIEF DESCRIPTION OF THE DRAWINGS

FIGS. 7A and 7B are views schematically illustrating a first state and a second state of each of the plurality of clamp portions according to one embodiment of the present invention.

DETAILED DESCRIPTION OF THE INVENTION

Figure 1A:
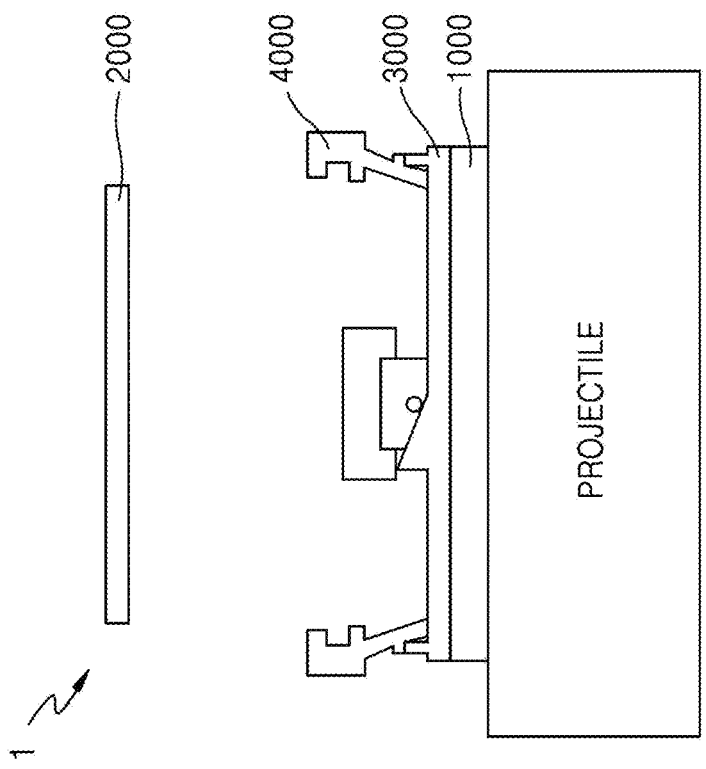
FIGS. 1A and 1B are views schematically illustrating a separation adapter according to one embodiment of the present invention.

Various embodiments and/or aspects will be disclosed with reference to the drawings. In the following description, for the purpose of description, numerous specific details are set forth in order to facilitate an overall understanding of one or more aspects. However, it will also be appreciated by a person having ordinary skill in the art to which the present invention pertains that such aspect(s) may be practiced without the specific details. The following description and the accompanying drawings will be set forth in detail for specific illustrative aspects among the one or more aspects. However, the aspects are provided for illustrative purposes, some of various schemes based on principles of various aspects may be employed, and descriptions set forth herein are intended to include all the aspects and equivalents thereof.

The terms "embodiment", "example", "aspect", "illustration", and the like used herein may not be construed as indicating that any aspect or design set forth herein is preferable or advantageous over other aspects or designs.

Further, the term "or" is intended to signify an inclusive "or" rather than an exclusive "or". In other words, unless otherwise specified or contextually unclear, the expression "X uses A or B" is intended to signify one of natural inclusive substitutions. That is, when X uses A; X uses B; or X uses both A and B, the expression "X uses A or B" may apply to either of the above cases. In addition, it is to be understood that the term "and/or" used herein refers to and includes all possible combinations of one or more of listed relevant items.

In addition, it is to be understood that the terms "include" and/or "comprise" indicate the presence of corresponding features and/or elements, but do not preclude the presence or addition of one or more other features, elements, and/or groups thereof.

Further, in the present disclosure, it is to be understood that singular expressions such as "a(n)" and "the" include plural expressions as well, unless explicitly indicated otherwise. Accordingly, as an example, a "component surface" includes one or more component surfaces.

In addition, although the terms including ordinal numbers such as "first" and "second" may be used to describe various elements, the elements are not limited by the terms. The above terms are used merely for the purpose of distinguishing one element from another element. For example, a first element may be termed as a second element, and similarly, a second element may also be termed as a first element without departing from the scope of the present invention. The term "and/or" includes any combination of a plurality of described relevant items, or one of the described relevant items.

Further, the terms used herein are used only to describe specific embodiments, and are not intended to limit the present invention. Unless the context explicitly indicates otherwise, an expression in a singular form includes a meaning of a plural form as well. In the present disclosure, the term such as "include" or "have" is intended to designate the presence of characteristics, numbers, steps, operations, elements, parts, or combinations thereof described herein, and shall not be construed to preclude any possibility of the presence or addition of one or more other characteristics, numbers, steps, operations, elements, parts, or combinations thereof.

In addition, unless defined otherwise, all terms used in embodiments of the present invention, including technical and scientific terms, have the same meaning as those commonly understood by a person having ordinary skill in the art to which the present invention pertains. Any terms as those defined in generally used dictionaries are to be interpreted to have the meanings consistent with the contextual meanings in the relevant field of art, and are not to be interpreted to have idealistic or excessively formalistic meanings unless explicitly defined in the embodiments of the present invention.

Conventionally, in order to separate a payload from a projectile in a space environment, an explosive separation structure in which bolts are fastened to the payload and the projectile and the bolts are cut using explosives has been generally used. However, since the explosive separation structure uses explosives, the overall stability is deteriorated, and there is a problem in that an impact is applied to the payload, causing a failure of a payload electronic component and an optical system.

To solve the above problem, the present invention discloses a separation adapter 1 using a ring-synchronized separation structure.

Specifically, the ring-synchronized separation structure corresponds to a technology for fastening the payload by rotating a drive member 3000 that makes contact with a clamp portion 400 in a state where the payload is fastened by a plurality of segmented clamp portions 4000. With such a configuration, the separation adapter 1 of the present invention may separate the payload from the projectile without using explosion.

That is, the separation adapter 1 of the present invention may exhibit an effect of significantly improving stability as compared to an adapter that uses the explosive separation structure.

Hereinafter, the separation adapter 1 according to one embodiment of the present invention will be described in detail.

FIG. 1 is a view schematically illustrating the separation adapter 1 according to one embodiment of the present invention.

Figure 1B:
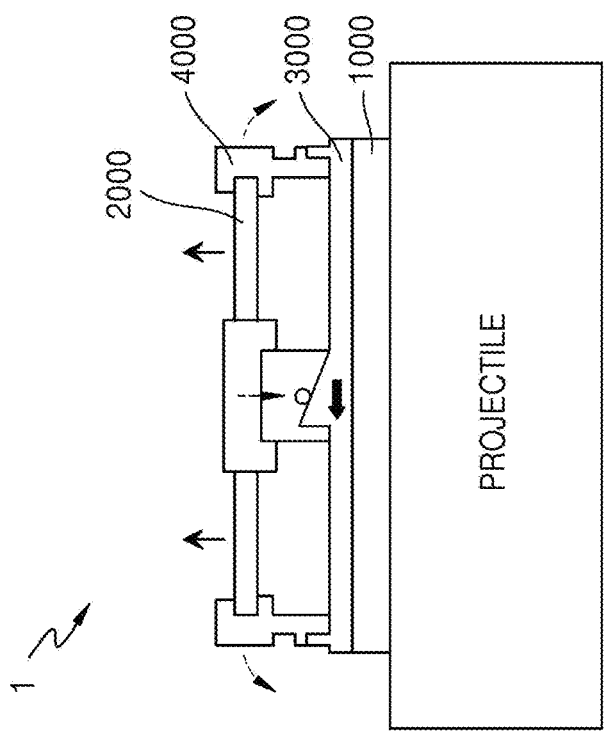

FIG. 1A schematically illustrates the separation adapter 1 when a plurality of clamp portions 4000 is in a first state according to one embodiment of the present invention, and FIG. 1B schematically illustrates the separation adapter 1 when the plurality of clamp portions 4000 is in a second state according to one embodiment of the present invention.

According to one embodiment of the present invention, the separation adapter 1 for separating a payload from a projectile in a space environment may include: a lower ring 1000 coupled to the projectile; an upper ring 2000 coupled to the payload; a drive member 3000 rotatably coupled to an upper surface of the lower ring 1000 along a rim of the lower ring 1000; and the plurality of clamp portions 4000, each of which is fixed to the upper surface of the lower ring 1000 and located inward of the drive member 3000, and in which a part of the drive member 3000 makes contact with an outside of the clamp portion 4000 and a rim of the upper ring 2000 is fastened to an inside of the clamp portion 4000.

In such a configuration, as the drive member 3000 rotates, the plurality of clamp portions 4000 may be simultaneously switched from the first state to the second state, the first state may be a state in which a force is applied to each of the clamp portions 4000 in an inward direction of the lower ring 1000 by the part of the drive member 3000, and the second state may be a state in which the force applied to each of the clamp portions 4000 in the inward of the lower ring 1000 is released by the part of the drive member 3000.

According to one embodiment of the present invention, in a state where the rim of the upper ring 2000 is fastened to the inside of the plurality of clamp portions 4000 in the separation adapter 1, the drive member 3000 may rotate along the rim of the lower ring 1000, so that the part of the drive member 3000 may move along the rim of the lower ring 1000, the part of the drive member 3000 may move along the rim of the lower ring 1000, so that the plurality of clamp portions 4000 are simultaneously switched from the first state to the second state, and the plurality of clamp portions 4000 are simultaneously switched from the first state to the second state, so that fastening between the plurality of clamp portions 4000 and the rim of the upper ring 2000 may be released and the upper ring 2000 may be separated from the lower ring 1000.

The lower ring 1000, the upper ring 2000, and the plurality of clamp portions 4000 correspond to a configuration in which the payload is connected to the projectile and the payload is separated from the projectile.

Specifically, as illustrated in FIG. 1A, a lower surface of the lower ring 1000 may be coupled to the projectile. Although not illustrated, the payload may be coupled to an upper surface of the upper ring 2000. In particular, a lower portion of the plurality of clamp portions 4000 may be fixed to the lower ring 1000, and a rim of the upper ring 2000 may be fastened to an inside of an upper portion of the plurality of clamp portions 4000. That is, as the plurality of clamp portions 4000 are fastened to the upper ring 2000, the lower ring 1000 may be connected to the upper ring 2000, and the payload may be connected to the projectile.

Meanwhile, as shown in FIG. 1B, when the plurality of clamp portions 4000 releases the fastening state with the upper ring 2000, the lower ring 1000 may be separated from the upper ring 2000, and the payload may be separated from the projectile.

That is, according to one embodiment of the present invention, the separation adapter 1 may connect and separate the upper ring 2000 to and from the lower ring 1000 through a simple process of controlling the fastening between the plurality of clamp portions 4000 and the rim of the upper ring 1000, so that it may be easy to connect the payload to the projectile and separate the payload from the projectile.

Meanwhile, the drive member 3000 corresponds to a configuration for implementing a ring-synchronized separation structure of simultaneously controlling the fastening state between the plurality of clamp portions 4000 and the upper ring 2000.

Specifically, the drive member 3000 may be coupled to a rim region of the lower ring 1000 to rotate along the rim of the lower ring 1000. In addition, a part of the drive member 3000 may protrude in a height direction from the upper surface thereof.

According to one embodiment of the present invention, the drive member 3000 may have a ring shape in a plan view when viewed from a top. When the drive member 3000 has a ring shape, a diameter of an outer circumference of the drive member 3000 is preferably smaller than a diameter of an outer circumference of the lower ring 1000. However, the shape of the drive member 3000 is not limited to the ring shape.

The plurality of clamp portions 4000 may be coupled to the upper surface of the lower ring 1000, and may be coupled to the inside of the drive member 3000. In this case, a part of the drive member 3000 may make contact with an outside of each of the clamp portions 4000. In such a structure, a part of the drive member 3000 may have a position relative to each of the clamp portions 4000. Hereinafter, the relative position of a part of the drive member 3000 and each of the clamp portions 4000 is referred to as a relative position of the drive member 3000.

According to one embodiment of the present invention, a force, which is applied to each of the clamp portions 4000 in an inward direction of the lower ring 1000 by a part of the drive member 3000, may vary depending on the relative position of the drive member 3000.

In particular, according to one embodiment of the present invention, each of the clamp portions 4000 may be pressed in the inward direction of the lower ring 1000 and may be fastened to the upper ring 2000 when a force equal to or greater than a preset limit pressure is applied, and the fastening with the upper ring 2000 may be released when the force equal to or greater than the preset limit pressure is not applied in the inward direction of the lower ring 1000.

That is, the ring-synchronized separation structure corresponds to a structure in which a part of the drive member 3000 makes contact with the outside of the plurality of clamp portions 4000, and thus the drive member 3000 and the plurality of clamp portions 4000 have a relative position (relative position of the drive member 3000). With the ring-synchronized separation structure, according to one embodiment of the present invention, the relative position of the drive member 3000 is adjusted, so that a fore applied to the plurality of clamp portions 4000 may be adjusted, and as the force applied to the plurality of clamp portions 4000 is adjusted, the fastening state of the clamp portions 4000 may be controlled.

FIGS. 1A and 1B exemplarily illustrate an operation process of the ring-synchronized separation structure according to one embodiment of the present invention.

As illustrated in FIGS. 1A and 1B, a part of the drive member 3000 may have a shape protruding in a height direction and having a height that gradually decreases from the left to the right.

In such a shape, a part of the drive member 30000 may have a relative position of the drive member 3000 as illustrated in FIG. 1A. At the relative position of the drive member 3000 as illustrated in FIG. 1A, since a part of the drive member 3000 makes contact with the outside of each of the clamp portions 4000 through a relatively large area, the relative position of the drive member 3000 corresponds to a relative position where a part of the drive member 3000 may apply the force equal to or greater than the preset limit pressure to each of the clamp portions 4000 in the inward direction of the lower ring 1000. That is, at the relative position of the drive member 3000 as illustrated in FIG. 1A, a part of the drive member 3000 may apply the force equal to or greater than the preset limit pressure to each of the clamp portions 4000 in the inward direction of the lower ring 1000, and accordingly, the inner upper portion of each of the clamp portions 4000 may be fastened to the rim region of the upper ring 2000.

Meanwhile, when the drive member 3000 rotates clockwise, a part of the drive member 3000 may move to the left, and a part of the drive member 3000 may have a relative position as illustrated in FIG. 1B. At the relative position of the drive member 3000 as illustrated in FIG. 1B, since a part of the drive member 3000 makes contact with the outside of each of the clamp portions 4000 through a relatively small area, the relative position of the drive member 3000 corresponds to a relative position where a part of the drive member 3000 may not apply the force equal to or greater than the preset limit pressure to each of the clamp portions 4000 in the inward direction of the lower ring 1000. That is, at the relative position of the drive member 3000 as illustrated in FIG. 1B, a part of the drive member 3000 may not apply the force equal to or greater than the preset limit pressure to each of the clamp portions 4000 in the inward direction of the lower ring 1000, and accordingly, each of the clamp portions 4000 is widened in the outward direction of the lower ring 1000, and the fastening between the inner upper portion of each of the clamp portions 4000 and the rim region of the upper ring 2000 may be released.

According to one embodiment of the present invention, the separation adapter 1 applies the ring-synchronized separation structure for simultaneously releasing the fastening state between the plurality of segmented clamp portions 4000 and the upper ring 2000, only by rotating the drive member 3000, so that it is possible to achieve safety and improve accuracy in separation of the payload as compared to an adapter to which the conventional explosive separation structure is applied.

In particular, according to one embodiment of the present invention, as compared to the conventional explosive separation adapter, the separation adapter 1 of the present invention does not cause breakage due to explosion in a process of connecting the payload to the projectile and a process of separating the payload from the projectile, so that it is possible to reuse the separation adapter 1.

Meanwhile, according to one embodiment of the present invention, a part of the drive member 3000 may be a plurality of stoppers 3100 which has a shape protruding from the upper surface of the drive member 3000 such that a height of the stopper 3100 gradually decreases from one side to the other side of the stoppers 3100, and the plurality of stoppers 3100 will be described in detail with reference to the drawings to be described below.

According to one embodiment of the present invention, an angle at which the plurality of clamp portions 4000 are coupled to the lower ring 1000 may vary. In such a structure, when a force is not applied to the plurality of clamp portions 4000 in the inward direction of the lower ring 1000, the plurality of clamp portions 4000 is preferably widened in the outward direction of the lower ring 1000. The plurality of clamp portions 4000 will be described in detail with reference to the drawings to be described below.

Figure 2:
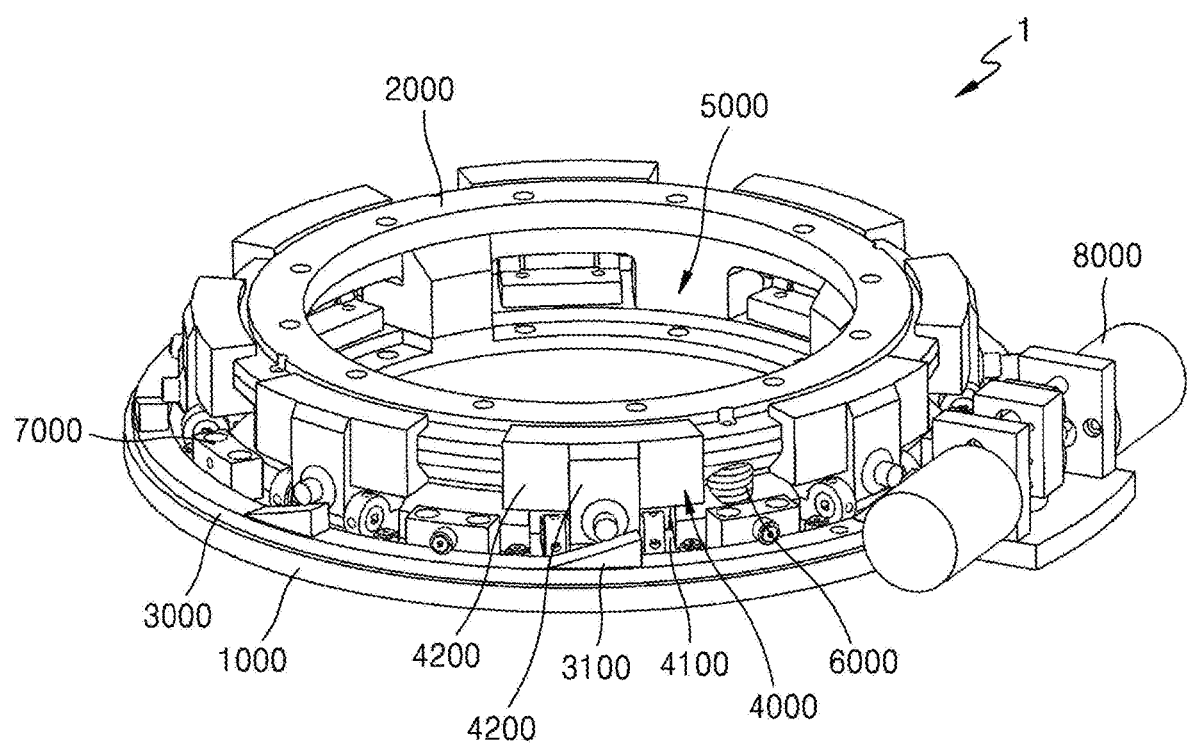
FIG. 2 is a perspective view schematically illustrating the separation adapter in a first state according to one embodiment of the present invention.
Figure 3:
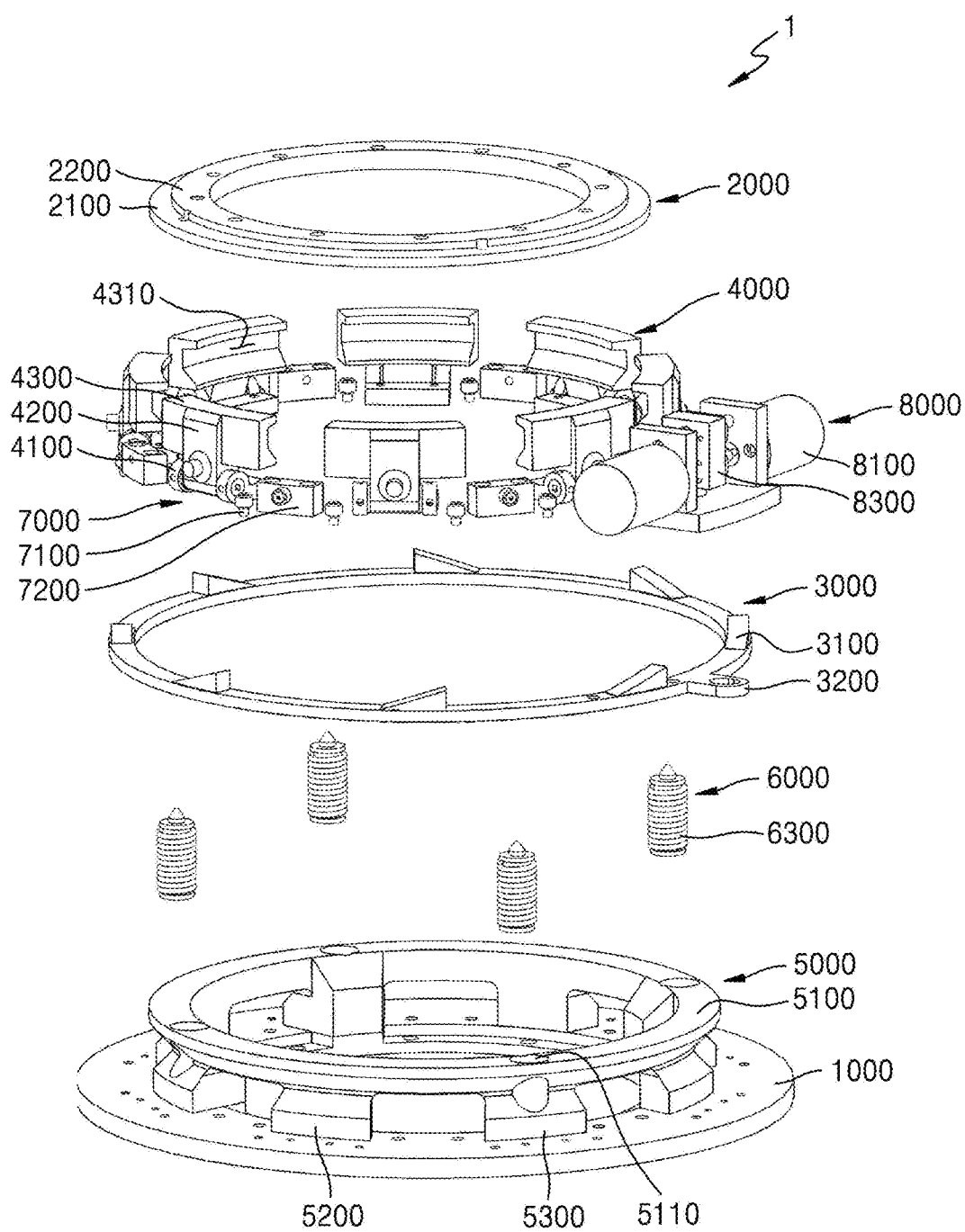
FIG. 3 is an exploded perspective view schematically illustrating the separation adapter according to one embodiment of the present invention.

FIG. 2 is a perspective view schematically illustrating the separation adapter 1 according to one embodiment of the present invention, and FIG. 3 is an exploded perspective view schematically illustrating the separation adapter 1 according to one embodiment of the present invention.

As described above, the lower ring 1000 may be fixed to the projectile, and the upper ring 2000 may be fixed to the payload. That is, according to one embodiment of the present invention, as the upper ring 2000 is connected to the lower ring 1000, the payload may be connected to the projectile, and as the upper ring 2000 is separated from the lower ring 1000, the payload may be separated from the projectile.

Further, as described above, in order to connect the upper ring 200 to the lower ring 1000, the plurality of clamp portions 4000, each of which has a lower portion fixed to the upper surface of the lower ring 1000 and an upper surface fastened to the rim of the upper ring 2000, may be fixed.

In particular, as illustrated in FIGS. 2 and 3, the upper ring 2000 may be a plate having a ring-shaped plane as a whole. The upper ring 2000 may include: a rod coupling portion 2200 which is a ring-shaped plate member and allows a payload to be coupled to an upper surface thereof; and a ring fastening portion 2100 which is a ring-shaped plate member fixed to a lower side of the rod coupling portion 2200 and having a diameter that is larger than a diameter of the rod coupling portion 2200 to extend outward from the rod coupling portion 2200. In such a configuration, the plurality of clamp portions 4000 may be fastened to a rim side of the ring fastening portion 2100, so that the upper ring 2000 may be coupled to the lower ring 1000.

To control the fastening state of the plurality of clamp portions 4000 and the upper ring 2000, the drive member 3000 may be coupled to the upper surface of the lower ring 1000. According to one embodiment of the present invention, the drive member 3000 may have a ring shape as a whole, and is preferably coupled to the outside of the plurality of clamp portions 4000. However, the shape of the drive member 3000 is not limited to the ring shape. According to one embodiment of the present invention, the drive member 3000 may rotate along the rim of the lower ring 1000.

As illustrated in FIGS. 2 and 3, a part of the drive member 3000 may protrude in a height direction from the upper surface of the drive member 3000. According to one embodiment of the present invention, a part of the drive member 3000 may be the plurality of stoppers 3100. The plurality of stoppers 3100 may apply a force from the outside of the plurality of clamp portions 4000 in the inward direction of the lower ring 1000. In the ring-synchronized separation structure according to one embodiment of the present invention, the force applied to the plurality of clamp portions 4000 by the plurality of stoppers 3100 may vary depending on a relative position of the plurality of stoppers 3100 and the plurality of clamp portions 4000. The ring-synchronized separation structure will be described in more detail with reference to the drawings to be described below.

Meanwhile, as illustrated in FIG. 3, the drive member 3000 may include a drive protruding portion 3200 protruding outward from a part of a rim of the drive member 3000. The drive protruding portion 3200 may be connected to an actuator 8000 to transmit power that enables the drive member 3000 to rotate along the rim of the lower ring 1000.

In order to assist the drive member 3000 in rotating along the rim of the lower ring 1000, according to one embodiment of the present invention, a ring guide portion 7000 may be disposed on the upper surface of the lower ring 1000. The ring guide portion 7000 may make contact with the upper surface of the drive member 3000 and an inner circumferential surface of the drive member 3000, which will be described in more detail with reference to the drawings to be described below.

Meanwhile, the separation adapter 1 according to one embodiment of the present invention may further include an upper ring support 5000 supporting the upper ring 2000, in which the upper ring support 5000 may include: an upper end flange 5100 having a shape corresponding to the lower surface of the upper ring 2000 as a whole; a flange fixing portion 5200 coupled to the upper surface of the lower ring 1000 while extending downward from the upper end flange 5100; and a module accommodating portion 5300 coupled to the upper surface of the lower ring 1000 while extending downward from the upper end flange 5100, and forming an internal space.

According to one embodiment of the present invention, the upper ring support 5000 corresponds to a configuration disposed between the lower ring 1000 and the upper ring 2000 to support the lower surface of the upper ring 2000.

As illustrated in FIGS. 2 and 3, the upper end flange 5100 preferably corresponds to a flange having a ring-shaped plane as a whole, and has a diameter corresponding to a diameter of the lower surface of the upper ring 2000 (a diameter from the center to the rim of the ring).

The flange fixing portion 5200 may be coupled to the upper surface of the lower ring 1000 while extending downward from the upper end flange 5100 to support the upper end flange 5100. Preferably, a plurality of flange fixing portions 5200 are disposed.

The module accommodating portion 5300 may be coupled to the upper surface of the lower ring 1000 while extending downward from the upper end flange 5100 to support the upper end flange 5100. In particular, the module accommodating portion 5300 may form the internal space, and a kick-off module 6000 may be accommodated in the internal space as illustrated in FIG. 2.

According to one embodiment of the present invention, the kick-off module 6000 corresponds to a configuration for assisting separation of the upper ring 2000 by allowing the upper ring 2000 to have a thrust in an upward direction of the lower ring 1000 when the upper ring 2000 is separated from the lower ring 1000. Specifically, the kick-off module 6000 may include a compression spring 6300, and when the upper ring 2000 is separated from the lower ring 1000, the compression spring 6300 may be pressed in the upward direction of the lower ring 1000 from a lower surface side of the upper ring 2000 by a tensile force of the compression spring 6300. The kick-off module 6000 will be described in more detail with reference to the drawings to be described below.

FIG. 4 is a side view and a plan view schematically illustrating the separation adapter 1 according to one embodiment of the present invention.

Figure 4A:
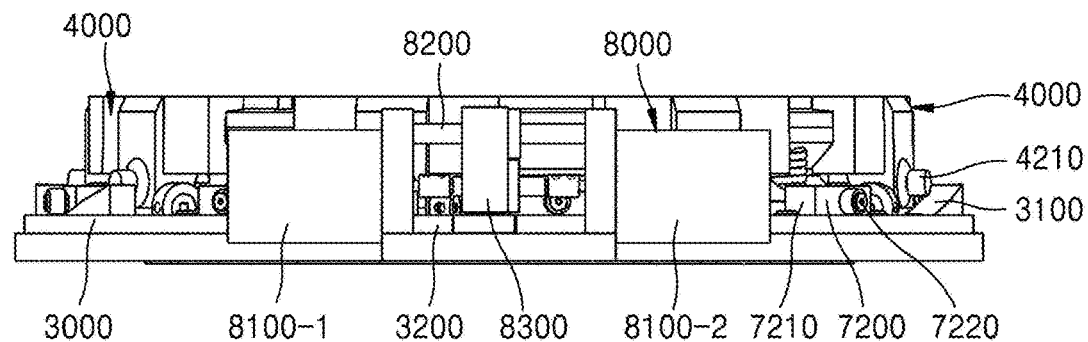
FIGS. 4A and 4B are a side view and a plan view schematically illustrating the separation adapter according to one embodiment of the present invention.
Figure 4B:
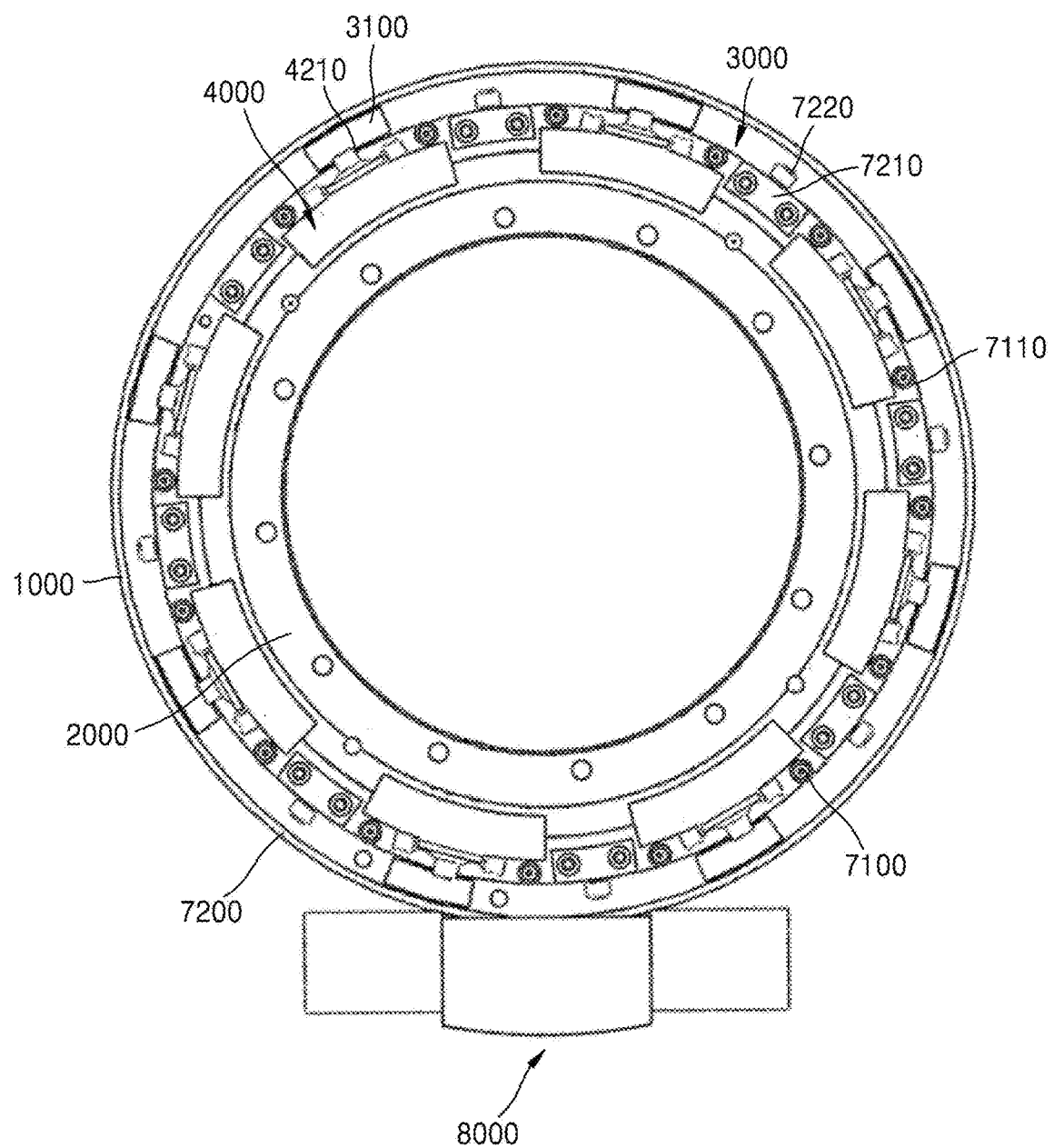

FIG. 4A is a side view schematically illustrating a side of the actuator 8000 of the separation adapter 1 according to one embodiment of the present invention, and FIG. 4B is a plan view illustrating the separation adapter 1 according to one embodiment of the present invention.

The separation adapter 1 may further include the actuator 8000 for providing power that enables the drive member 3000 to rotate along the rim of the lower ring 1000. Specifically, the actuator 8000 may include: a power providing portion 8100; a guide member 8200 connected to the power providing portion 8100; and a power transmitting portion 8300 receiving the power from the power providing portion 8100 and guided by the guide member 8200 to perform a translational motion.

According to one embodiment of the present invention, the actuator 8000 may be a linear actuator 8000 which includes the power providing portion 8100 including a motor and a screw to switch a rotation motion generated from the motor to the translational motion.

Referring to FIG. 3 together, the drive member 3000 may be connected to the power transmitting portion 8300 through the drive protruding portion 3200 that protrudes outward from the outer circumferential surface of the drive member 3000. In such a structure, when the power transmitting portion 8300 translates, the drive member 3000 may rotate clockwise or counterclockwise.

For example, based on FIG. 4B, when the power transmitting portion 8300 moves to the left, the drive member 3000 may rotate clockwise along the rim of the lower ring 1000, and when the power transmitting portion 8300 moves to the right, the drive member 3000 may rotate counterclockwise along the rim of the lower ring 1000.

According to one embodiment of the present invention, the power transmitting portion 8300 is connected to the drive member 3000 and the power transmitting portion 8300 translates, so that the drive member 300 may exhibit an effect of rotating the drive member 3000 along the rim of the lower ring 1000.

FIG. 5 is a view schematically illustrating a vertical ring guide portion 7100 and a horizontal ring guide portion 7200 according to one embodiment of the present invention.

Figure 5A:
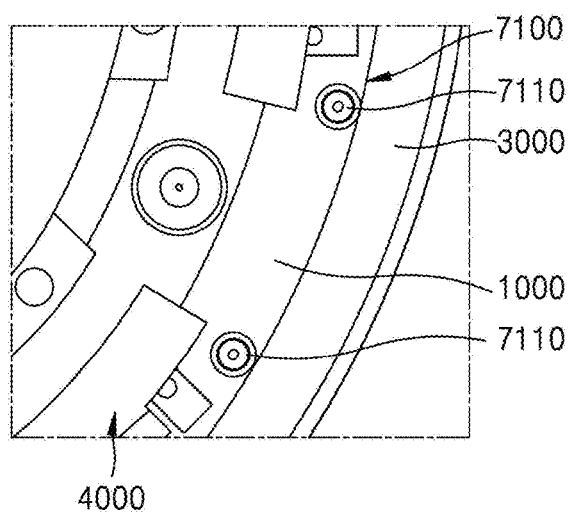
FIGS. 5A and 5B are views schematically illustrating a vertical ring guide portion and a horizontal ring guide portion according to one embodiment of the present invention.
Figure 5B:
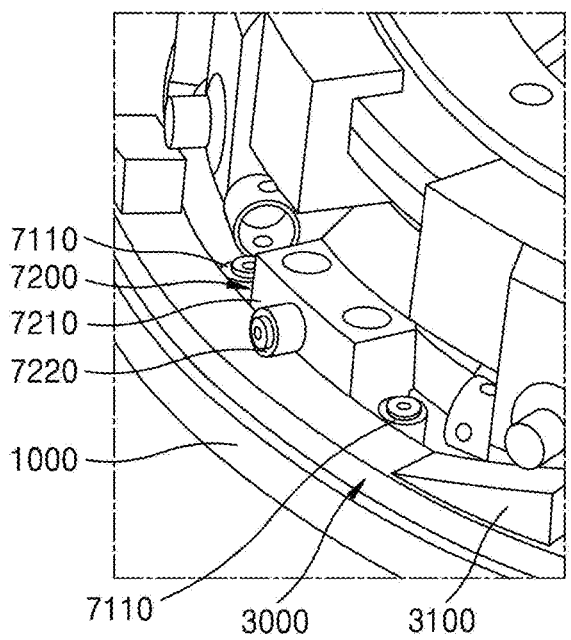

FIG. 5A is an enlarged view of a side of the vertical ring guide portion 7100 in the plan view of the separation adapter 1 according to one embodiment of the present invention, and FIG. 5B is an enlarged view of the vertical ring guide portion 7100 and a side of the horizontal ring guide portion 7200 in the perspective view of the separation adapter 1 according to one embodiment of the present invention.

According to one embodiment of the present invention, the separation adapter 1 may further include a ring guide portion 7000 guiding the drive member 3000 such that the drive member 3000 rotates along the edge of the lower ring, in which the ring guide portion 7000 may include: the vertical ring guide portion 7100 including a plurality of first ring guides 7110, each of which has a roll shape as a whole, is rotatably connected to the upper surface of the lower ring 1000 about a shaft, and makes contact with the inner circumferential surface of the drive member 3000; and the horizontal guide portion 7200 including: a plurality of guide fixing members 7210, each of which has a block shape as a whole, is disposed on the upper surface of the lower ring 1000, and is located inward of the drive member 3000; and a plurality of second ring guides 7220, each of which is rotatably connected to the outer surface of each of the plurality of guide fixing members 7210 about a shaft and makes contract with the upper surface of the drive member 3000.

As described above, the ring guide portion 7000 corresponds to a configuration that guides an operation of rotating the drive member 3000 along the rim of the lower ring 1000 To this end, the ring guide portion 7000 may include the vertical ring guide portion 7100 making vertical contact with the drive member 3000, and the horizontal ring guide portion 7200 making horizontal contact with the drive member 3000.

As illustrated in FIG. 5A, the vertical ring guide portion 7100 may include the plurality of ring guides 7110, each of which has a roll shape as a whole, is rotatably coupled to the upper surface of the lower ring 1000 about a shaft, and is coupled so as to make contact with the inner circumferential surface of the drive member 3000.

In addition, as illustrated in FIG. 5B, the horizontal ring guide portion 7200 may include a plurality of guide support members and the plurality of second ring guides 7220 fixed to the plurality of guide support members, respectively. Specifically, each of the guide support members may have a block shape as a whole, and may be located inward of the drive member 3000. Each of the second ring guides 7220 may be rotatably coupled to a side surface adjacent to the drive member 3000 about a shaft among four side surfaces of the of the guide support member, and may be coupled so as to make contact with the drive member 3000.

With such a configuration, the ring guide portion 7000 may guide the drive member 3000 to rotate along the rim of the lower ring 1000, may align the drive member 3000 at a predetermined position, and may stabilize the rotational movement of the drive member 3000. As the rotational movement of the drive member 3000 is stabilized, an operation of the payload separation structure may be stabilized, and ultimately, the reliability of the separation adapter 1 may be improved.

That is, according to one embodiment of the present invention, the ring guide portion 7000 ensures the stable rotational movement and the accurate alignment of the drive member 3000, so that it is possible to improve the operational stability of the payload separation structure.

FIG. 6 is a view schematically illustrating the plurality of clamp portions 4000 according to one embodiment of the present invention.

Figure 6A:
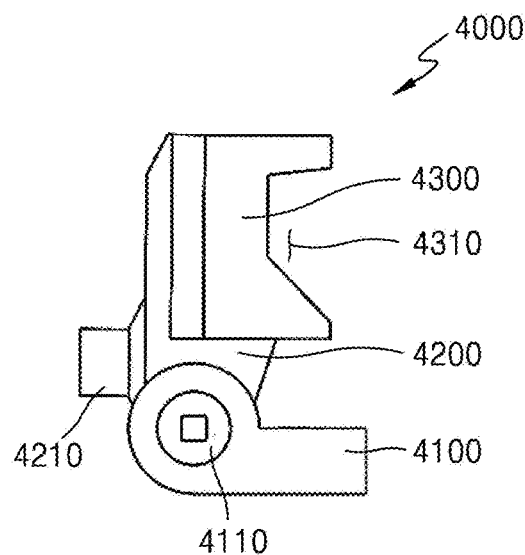
FIGS. 6A, 6B, and 6C are views schematically illustrating a plurality of clamp portions according to one embodiment of the present invention.
Figure 6B:
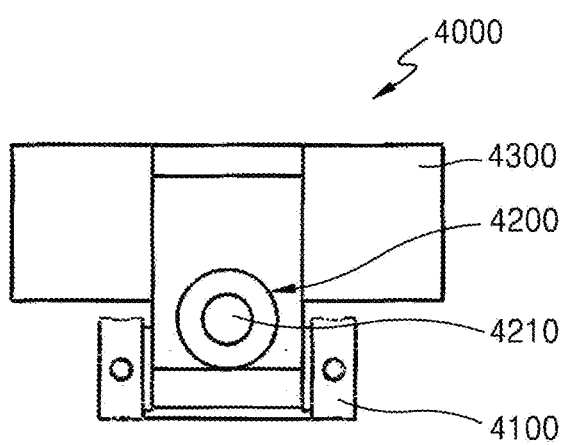
Figure 6C:
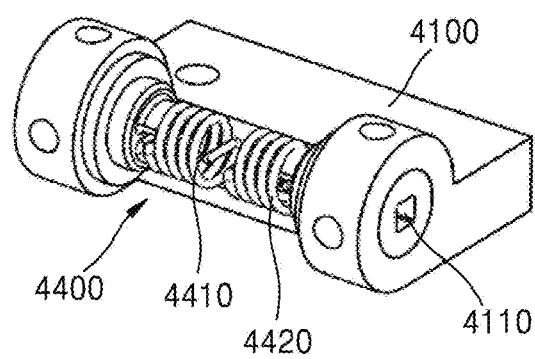

FIG. 6A is a side view illustrating each of the clamp portions 4000 according to one embodiment of the present invention, FIG. 6B is a front view illustrating an outer surface of each of the clamp portions 4000 according to one embodiment of the present invention, and FIG. 6C is a perspective view schematically illustrating a clamp holder portion 4100 and a torsion spring portion 4400 according to one embodiment of the present invention.

According to one embodiment of the present invention, each of the clamp portions 4000 may include: a clamp holder portion 4100 fixed to the upper surface of the lower ring 1000; a clamp body portion 4200 having a lower portion rotatably coupled to the clamp holder portion 4100 about a shaft in which the part of the drive member makes contact with an outer portion of the clamp body portion 4200; and a clamp fastening portion 4300 coupled to an inner upper portion of the clamp body portion 4200 and including a fastening groove portion 4310 which is concavely recessed such that the rim of the upper ring 2000 is fastened thereto.

In this case, the clamp body portion 4200 may further include a contact protruding portion 4210 protruding in a direction perpendicular to an outer surface of the clamp body portion 4200, and having a cylindrical shape as a whole so that the outer circumferential surface thereof makes line-contact with a part of the drive member 3000.

As described above, the plurality of clamp portions 4000 corresponds to a configuration in which the lower portion thereof is fixed to the lower ring 1000 and the rim of the upper ring 2000 is fastened to the inside of the upper portion thereof so that the lower ring 1000 and the upper ring 2000 are connected to each other.

Referring to the plan view of FIG. 4B together, the plurality of clamp portions 4000 are preferably disposed to be line symmetrical with respect to a virtual x-axis (a virtual line extending vertically based on FIG. 4) or a vertical y-axis (a virtual line extending horizontally based on FIG. 4).

As illustrated in FIG. 6A, each of the clamp portions 4000 may include the clamp holder portion 4100 fixed to the upper surface of the lower ring 1000, the clamp body portion 4200 rotatably coupled to the clamp holder portion 4100 about a shaft, and a clamp fastening portion 4300 coupled to the inner upper portion of the clamp body portion 4200.

Specifically, the clamp holder portion 4100 may have a hinge structure therein. In addition, although not illustrated, an axial member (not illustrated) may be disposed under the clamp body portion 4200 such that the axial member may be coupled to the hinge structure. That is, according to one embodiment of the present invention, the clamp body portion 4200 may be rotatably coupled to the clamp holder portion about the axial member (not illustrated). Accordingly, an angle of the clamp body portion 4200 with respect to the lower ring 1000 may vary.

As illustrated in FIG. 6A, the clamp fastening portion 4300 may include the fastening groove portion 4310 which is fixed to the inner upper portion of the clamp body portion 4200 and is concavely recessed such that the rim of the upper ring 2000 may be fastened to an inner surface thereof.

With such a structure, the plurality of clamp portions 4000 may be fastened to the rim of the upper ring 2000 to connect the upper ring 2000 to the lower ring 1000.

Meanwhile, as illustrated in FIGS. 6A and 6B, the contact protruding portion 4210 having a cylindrical shape as a whole and protruding in the direction perpendicular to the outer surface of the clamp body portion 4200 may be provided on the outside of the clamp body portion 4200. According to one embodiment of the present invention, the contact protruding portion 4210 may make line-contact with the upper surface of each of the stoppers 3100. With such a structure, the contact protruding portion 4210 may allow a part of the drive member 3000 and the outer surface of the clamp body portion 4200 of each of the clamp portions 4000 to be properly aligned.

In particular, according to one embodiment of the present invention, as relative positions of each of the clamp unit 4000 and each of the stoppers 3100 vary, relative positions of the contact protruding portion 4210 of each of the clamp portions 4000 and each of the stoppers 3100 may vary, and a user may check the relative positions of the contact protruding portion 4210 and each of the stoppers 3100, and thus it can be seen that a force of pressing each of the clamp portions 4000 in the inward direction of the lower ring 1000 by each of the stoppers 3100 may vary.

The variation in the force of pressing each of the clamp portions 4000 in the inward direction of the lower ring 1000 by each of the stoppers 3100 depending on the relative positions of the contact protrusions 4210 and each of the stoppers 3100 will be described in detail with reference to the drawings to be described below.

Meanwhile, according to one embodiment of the present invention, each of the clamp portions 4000 may further include the torsion spring portion 4000 disposed inside the clamp holder portion 4100, having one end connected to the lower portion of the clamp body portion 4200, and applying a force to the clamp body portion 4200 in an outward direction of the lower ring 1000, when the plurality of clamp portions 4000 are in the first state, the clamp body portion 4200 is applied with a force in the inward direction of the lower ring 1000 by a part of the drive member 3000, and when the plurality of clamp portions 4000 are in the second state, the clamp body portion 4200 is widened in the outward direction of the lower ring 1000 by the torsion spring portion 4400.

As described above, when the force is not applied to the plurality of clamp portions 4000 in the inward direction of the lower ring 1000, the plurality of clamp portions 4000 is preferably widened in the outward direction of the lower ring 1000. Meanwhile, when the force equal to or greater than the preset limit pressure is applied in the inward direction of the lower ring 1000, the plurality of clamp portions 4000 may stand upright with respect to the lower ring 1000.

To this end, each of the clamp portions 4000 according to one embodiment of the present invention may include the torsion spring portion 4400. As illustrated in FIG. 6C, the torsion spring portion 4400 may include a first torsion spring 4410 and a second torsion spring 4420 disposed inside the clamp holder portion 4100. In this case, one end of each of the first torsion spring 4410 and the second torsion spring 4420 may be fixed to the axial member (not illustrated) disposed under the clamp body portion 4200, and the other end of each of the first torsion spring 4410 and the second torsion spring 4420 may be connected to an end portion of the clamp holder portion 4100.

In this case, the clamp body portion 4200 may have an angle widened in the outward direction of the lower ring 1000 by the first torsion spring 4410 and the second torsion spring 4420.

Meanwhile, according to one embodiment of the present invention, when the force equal to or greater than the preset limit pressure is applied to each of the first torsion spring 4410 and the second torsion spring 4420, the first torsion spring 4410 and the second torsion spring 4420 may be compressed, and the clamp body portion 4200 may pivot about the axis member (not illustrated) to have an angle standing upright with respect to the lower ring 1000.

In one embodiment of the present invention, the limit pressure may correspond to a minimum pressure at which the torsion spring portion 4400 maintains its original shape. That is, when a force equal to or greater than a limit pressure is applied to the torsion spring portion 4400, the torsion spring portion 4400 may be deformed and the clamp body portion 4200 may pivot, and when a force below the limit pressure is applied to the torsion spring portion 4400, the torsion spring portion 4400 may maintain its original shape without being deformed.

As described above, when the plurality of clamp portions 4000 are in the second state, since the force applied to the plurality of clamp portions 4000 in the inward direction of the lower ring 1000 is released, the clamp body portion 4200 of the plurality of clamp portions 4000 may have an angle that is widened in the outward direction, and as the clamp body portion 4200 of the plurality of clamp portions 4000 is widened in the outward direction, the rim of the upper ring 2000 may not be fastened to the clamp fastening portion 4300.

When the plurality of clamp portions 4000 are in the first state, the force equal to or greater than the preset limit pressure may be applied in the inward direction of the lower ring 1000 to the plurality of clamp portions 4000. That is, as illustrated in FIG. 6A, when the plurality of clamp portions 4000 are in the first state, each of the clamp portions 4000 may have an upright angle, and as the clamp body portion 4200 of the plurality of clamp portions 4000 stands upright, the rim of the upper ring 2000 may be fastened to the clamp fastening portion 4300.

That is, when the plurality of clamp portions are in the first state, the upper ring 2000 may be fastened to the plurality of clamp portions 4000.

Meanwhile, the clamp holder portion 4100 may further include torsion adjusting portions 4110 rotatably disposed at both end sides of the clamp holder portion 4100, respectively, in which one side of the torsion adjusting portion may be exposed to an outside of the clamp holder portion 4100 and the other side of the torsion adjusting portion may be connected to the other end of the torsion spring portion 4400, and as the torsion adjusting portion 4110 rotates about a shaft, the other end of the torsion spring portion 4400 may rotate, and as the other end of the torsion spring portion 4400 rotates, a torsion of the torsion spring portion 4400 may be adjusted.

Meanwhile, the torsion of the torsion spring portion 4400 may vary depending on the degree of rotation of the end portion thereof, and according to one embodiment of the present invention, the torsion of the torsion spring portion 4400 may be adjusted by the torsion adjusting portion 4110.

Specifically, the other end of each of the first torsion spring 4410 and the second torsion spring 4420 included in the torsion spring portion 4400 may be connected to the other side of the torsion adjusting portion 4110 disposed at each of both end portions of the clamp holder portion 4100. In one embodiment of the present invention, since one side of the torsion adjusting portion 4110 is exposed to the outside of the clamp holder portion 4100, the user may easily pivot one side of the torsion adjusting portion 4110.

As the torsion adjusting portion 4110 rotates about a shaft, each of the first torsion spring 4410 and the second torsion spring 4420 may be tightened or loosened, and the torsion of each of the first torsion spring 4410 and the second torsion spring 4420 may be adjusted.

In one embodiment of the present invention, as the torsion of the torsion spring portion 4400 increases, the limit pressure of the torsion spring portion 4400 may increase, and as the torsion of the torsion spring portion 4400 decreases, the limit pressure of the torsion spring portion 4400 may decrease.

That is, according to one embodiment of the present invention, since the torsion of the torsion spring portion 4400 may be adjusted through an operation of simply rotating the torsion adjusting portion 4110, so that it is possible to control the torsion even without replacing the torsion spring portion 4400.

FIG. 7 is a view schematically illustrating the first state and the second state of each of the plurality of clamp portions 4000 according to one embodiment of the present invention, and FIG. 8 is a perspective view and an enlarged view schematically illustrating the separation adapter 1 according to one embodiment of the present invention.

In this case, FIG. 7A exemplarily illustrates the relative positions of each clamp portion 4000 and each stopper 3100 in the first state, and FIG. 7B exemplarily illustrates the relative positions of each of the clamp portions 4000 and each of the stoppers 3100 in the second state.

According to one embodiment of the present invention, the drive member 3000 may include: the plurality of stoppers 3100, each of which protrudes in a height direction from the upper surface of the drive member 3000, and has an inclined surface formed on an upper side thereof as a height of the stopper 3100 gradually decreases from one side to the other side, when the plurality of clamp portions 4000 are in the first state, the part of each of the clamp portions 4000 may make contact with one side of the inclined surface of each of the stoppers 3100, and when the plurality of clamp portions 4000 are in the second state, the part of each of the clamp portions 4000 may make contact with the other side of the inclined surface of each of the stoppers 3100.

As described above, the separation adapter 1 of the present invention may implement a ring-synchronized separation structure that simultaneously controls the fastening state between the plurality of clamp portions 4000 and the upper ring 2000 by the drive member 3000.

In order to implement the ring-synchronized separation structure, as illustrated in FIGS. 7 and 8, the drive member 3000 may include a plurality of stoppers 3100 each protruding in a height direction from an upper surface of the drive member 3000 and having a shape in which a height thereof is gradually lowered from one side to the other side. That is, the stopper 3100 may be formed on the upper surface thereof with the inclined surface.

In addition, as described above, the plurality of clamp portions 4000 may be coupled to the upper surface of the lower ring 1000 and located inward of the drive member 3000, and the stoppers 3100 may make contact with the outsides of the clamp portions 4000, respectively. Since the contact protruding portion 4210 protrudes vertically from the outside of the clamp portion 4000, the contact protruding portion 4210 may make contact with the upper surface of each of the stoppers 3100.

In such a structure, each of the stoppers 3100 may have a position relative to each of the clamp portions 4000. In particular, according to one embodiment of the present invention, as the drive member 3000 rotates and the relative positions of each of the stoppers 3100 and each of the clamp portions 4000 vary, the magnitude of the force, which is applied to each of the clamp portions 4000 in the inward direction of the lower ring 1000 by each of the stoppers 3100, may vary. In this case, the contact protruding portion 4210 may make contact with the upper surface (inclined surface) of the stopper 3100 to guide an operation of varying the relative positions of each of the stoppers 3100 and each of the clamp portions 4000. In this case, since the contact protruding portion 4210 has a cylindrical shape, the contact protruding portion 4210 may make line-contact with the upper surface of the stopper 3100, and due to such a structure, it may be easier for the contact protruding portion 4210 to guide an operation of varying the relative positions of the stopper 3100 and each of the clamp portions 4000.

In addition, the user may check the relative positions of each of the stoppers 3100 and the contact protruding portions 4210, so that it can be seen that the magnitude of the force, which is applied to each of the clamp units 4000 by each of the stoppers 3100 in the inward direction of the lower ring 1000, varies.

According to one embodiment of the present invention, each of the clamp portions 4000 may be pressed in the inward direction of the lower ring 1000 and may be fastened to the upper ring 2000 when a force equal to or greater than a preset limit pressure is applied, and the fastening with the upper ring 2000 may be released when the force equal to or greater than the preset limit pressure is not applied in the inward direction of the lower ring 1000.

According to one embodiment of the present invention, a state of each of the clamp portions 4000 illustrated in FIG. 7A may correspond to the first state. Specifically, when the contact protruding portion 4210 of each of the clamp portions 4000 makes contact with one side of the inclined surface of each of the stoppers 3100 as illustrated in FIG. 7A, each of the stoppers 3100 may apply the force equal to or greater than the preset limit pressure to each of the clamp portions 4000 in the inward direction of the lower ring 1000, and accordingly, each of the clamp portions 4000 may be fastened to the upper ring 2000.

On the contrary, according to one embodiment of the present invention, a state of each of the clamp portions 4000 illustrated in FIG. 7B may correspond to the second state. Specifically, when the contact protruding portion 4210 of each of the clamp portions 4000 makes contact with the other side of the inclined surface of each of the stoppers 3100 as illustrated in FIG. 7B, each of the stoppers 3100 may not apply the force equal to or greater than the preset limit pressure to each of the clamp portions 4000 in the inward direction of the lower ring 1000, and accordingly, each of the clamp portions 4000 may not be fastened to the upper ring 2000, so that the upper ring 200 may be separated from the lower ring 1000.

Figure 8A:
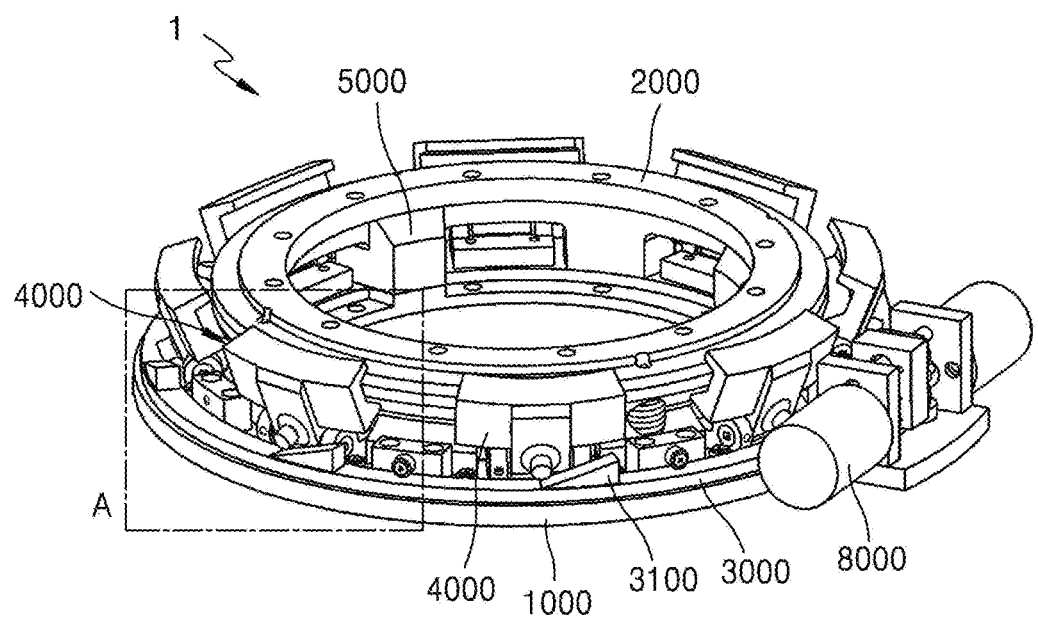
FIGS. 8A and 8B are a perspective view and an enlarged view schematically illustrating the separation adapter according to one embodiment of the present invention.
Figure 8B:
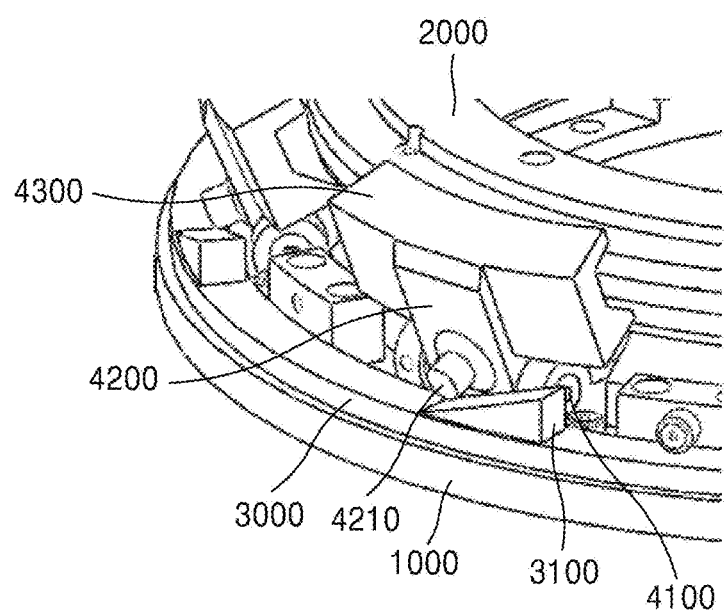

FIG. 8A is a perspective view illustrating a case in which the plurality of clamp portions 4000 of the separation adapter 1 according to one embodiment of the present invention are in the second state, and FIG. 8B corresponds to an enlarged view illustrating a region A illustrated in FIG. 8A.

That is, FIGS. 8A and 8B exemplarily illustrate an example of the separation adapter 1 when the plurality of clamp portions 4000 are in the second state as illustrated in FIG. 7B.

As illustrated in FIGS. 8A and 8B, the contact protruding portion 4210 of each of the clamp portions 4000 may make contact with the other side of the upper surface (inclined surface) of each of the stoppers 3100. That is, each of the stoppers 3100 may not apply the force equal to or greater than the limit pressure to each of the clamp portions 4000. Therefore, each of the clamp portions 4000 may be widened in the outward direction of the lower ring and the fastening with the upper ring 2000 may be released as illustrated in FIG. 8A.

Meanwhile, since the upper ring 2000 of the present invention is connected by the plurality of clamp portions 4000, it is preferable to simultaneously release the fastening state of the upper ring 2000 and the plurality of clamp portions 4000 in order to accurately and stably separate the payload fixed to the upper ring 2000. To this end, the separation adapter 1 according to one embodiment of the present invention may be implemented with the ring-synchronized separation structure.

Referring to FIGS. 2, 7, and 8 together, when the plurality of clamp portions 4000 are in the first state, each of the plurality of stoppers 3100 formed on the upper surface of the drive member 3000 may have a relative position where each of the plurality of clamp portions 4000 and the contact protruding portion 4210 make contact with one side of the upper surface of each of the plurality of stoppers 3100 as illustrated in FIG. 7A. Meanwhile, when the plurality of clamp portions 4000 are in the second state by the rotation of the drive member 3000, each of the plurality of stoppers 3100 may have a relative position where each of the plurality of clamp portions 4000 and the contact protruding portion 4210 make contact with the other side of the upper surface of each of the plurality of stoppers 3100 as illustrated in FIG. 7B.

With such a structure, as the drive member 3000 simply rotates, all of the plurality of stoppers 3100 may be switched from the first state to the second state, and the plurality of clamp portions 4000 may be simultaneously released from the upper ring 2000.

Figure 9:
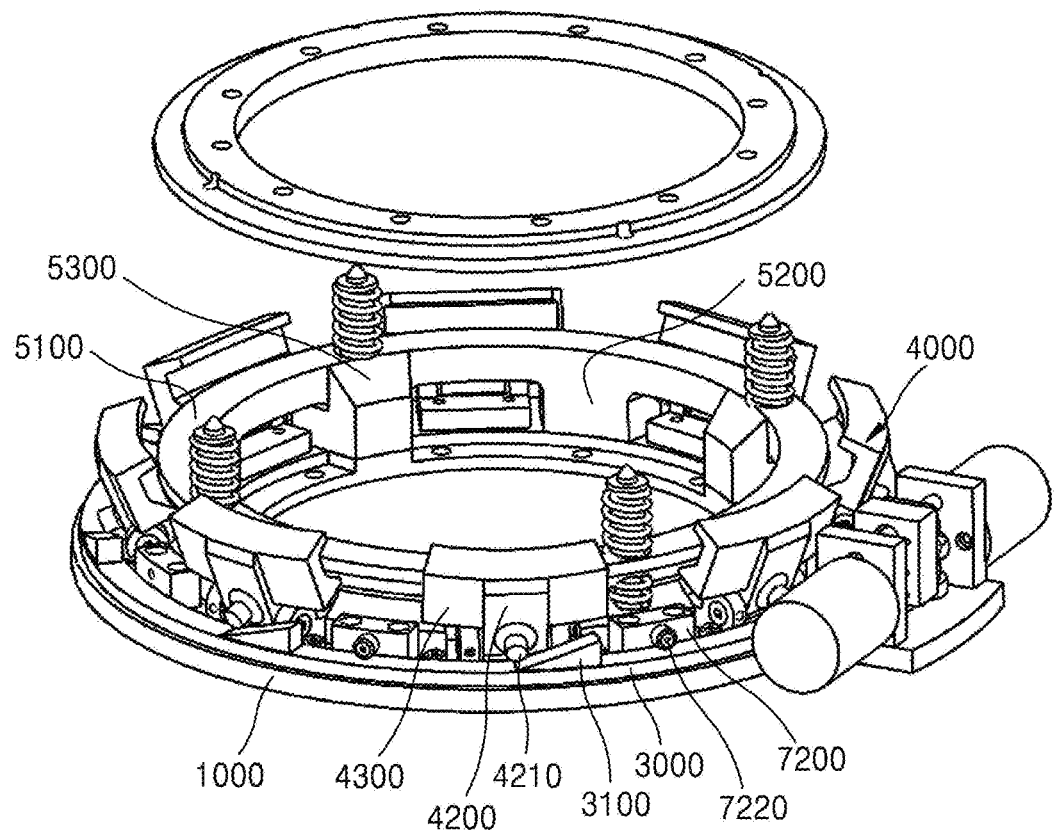
FIG. 9 is a perspective view schematically illustrating the separation adapter in a second state according to one embodiment of the present invention.

FIG. 9 is a perspective view schematically illustrating the separation adapter 1 in the second state according to one embodiment of the present invention, and FIG. 10 is a view schematically illustrating the kick-off module 6000 according to one embodiment of the present invention.

According to one embodiment of the present invention, the separation adapter 1 may further include a plurality of kick-off modules 6000 transmitting a force to the lower surface of the upper ring 2000 in the upward direction, in which each of the kick-off modules 6000 may include: a kick-off column portion 6100 having a column shape as a whole and having a lower end fixed to the upper surface of the lower ring 1000; a kick-off tube portion 6200 including: a tube body 6210 having a hollow tube shape as a whole and accommodating the kick-off column portion 6100 therein; a tube flange 6220 coupled to an upper side of the tube body 6210 and having a diameter greater than a diameter of the tube body 6210 as a whole; and a contact sensor 6230 coupled to an upper side of the tube flange 6220; and the compression spring 6300 configured to surround an outer circumferential surface of the kick-off tube portion 6200, when the plurality of clamp portions 4000 are in the first state, the compression spring 6300 is compressed downward by the upper ring 2000, and when the plurality of clamp portions 4000 are in the second state, the compression spring 6300 applies a force upward to the upper ring 2000.

As illustrated in FIG. 9, the upper ring 2000 is preferably separated upward from the lower ring 1000 upward direction. Therefore, the separation adapter 1 according to one embodiment of the present invention may include the plurality of kick-off modules 6000 capable of applying the force to the upper ring 2000 in the upward direction when the upper ring 2000 is separated from the lower ring 1000. According to one embodiment of the present invention, the plurality of kick-off modules 6000 may be accommodated inside the module accommodating portion 5300 of the upper ring support 5000.

Figure 10A:
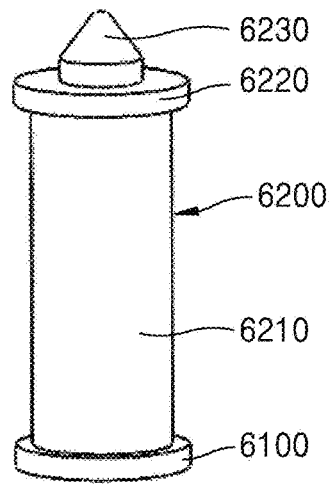
FIGS. 10A, 10B, 10C, and 10D are views schematically illustrating a kick-off module according to one embodiment of the present invention.
Figure 10B:
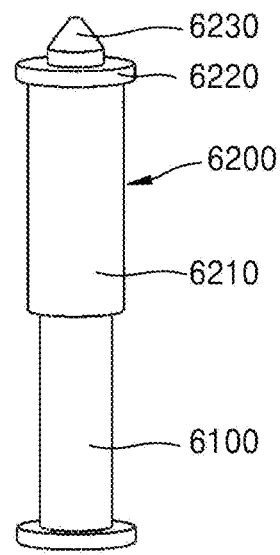
Figure 10C:
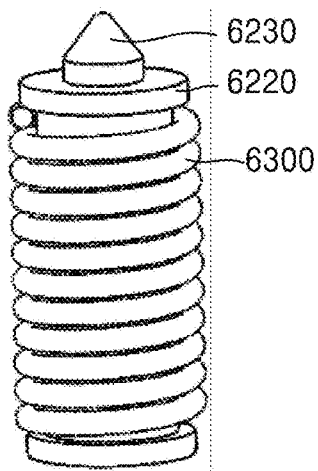
Figure 10D:
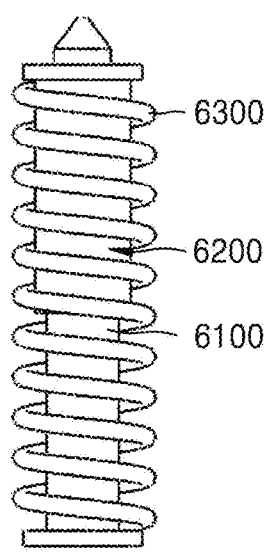

FIGS. 10A and 10B illustrate a case in which the kick-off module 6000 according to one embodiment of the present invention does not include the compression spring 6300, and FIGS. 10C and 10D illustrate a case in which the kick-off module 6000 according to one embodiment of the present invention includes the compression spring 6300.

As illustrated in FIG. 10A, the kick-off column portion 6100 may have a column shape as a whole, and may have the lower end fixed to the lower ring 1000.

Meanwhile, the kick-off tube portion 6200 includes the tube body 6210 having a tube shape as a whole, the tube flange 6220 coupled to the upper side of the tube body 6210, and the contact sensor 6230 coupled to the upper side of the tube flange 6220. As illustrated in FIG. 10B, the tube body 6210 may accommodate the kick-off column portion 6100 therein and move in a height direction (or an up-down direction) along the kick-off column portion 6100.

As illustrated in FIGS. 10C and 10D, the compression spring 6300 may be configured to surround the outer circumferential surface of the kick-off tube portion 6200 as a whole in a state in which the kick-off tube portion 6200 accommodates the kick-off column portion 6100 therein. In this case, the compression spring 6300 may not be separated upward from the tube body portion 6210 due to the tube flange 6220.

Referring to FIG. 2 together, when the plurality of clamp portions 4000 are in the first state and fastened to the rim of the upper ring 2000, the upper ring 2000 may compress the plurality of kick-off modules 6000 downward. In this case, the plurality of kick-off modules 6000 may be in a state in which the compression spring 6300 is compressed as illustrated in FIG. 10C.

As illustrated in FIG. 9, when the plurality of clamp portions 4000 are in the second state and released from the rim of the upper ring 2000, the plurality of kick-off modules 6000 may release a compression force applied to the compression spring 6300 as illustrated in FIG. 10D. That is, the compression spring 6300 disposed in the plurality of kick-off modules 6000 may apply a tensile force to the upper ring 2000 in the upward direction, so that the upper ring 2000 may have a thrust force in the upward direction of the lower ring 1000.

With such a configuration, the plurality of kick-off modules 6000 may assist the upper ring 2000 to be separated upward from the lower ring 1000.

Meanwhile, as illustrated in FIG. 9, the upper end flange 5100 of the upper ring support 5000 may include a module through-hole 5110 communicating with the module accommodating portion 5300. According to one embodiment of the present invention, a plurality of module through-holes 5110 are preferably formed corresponding to the number of the plurality of kick-off modules 6000. Further, a diameter of the module through-hole 5110 is preferably larger than a diameter of the tube flange 6220.

With such a structure, the kick-off tube portion 6200 may protrude upward from the upper end flange 5100 of the upper ring support 5000 through the module through-hole 5110, and may apply the tensile force to the upper ring 2000 in the upward direction.

Meanwhile, the kick-off tube portion 6200 may include the contact sensor 6230 thereon. The user may check in real time the contact state of the kick-off module 6000 and the upper ring 2000 by the contact sensor 6230.

According to one embodiment of the present invention, the plurality of kick-off modules 6000 may assist the upper ring 2000 to be separated upward from the lower ring 1000 by applying a tensile force to the upper ring 2000 in the upward direction, so that it is possible to improve accuracy of separation of the payload.

Figure 11:
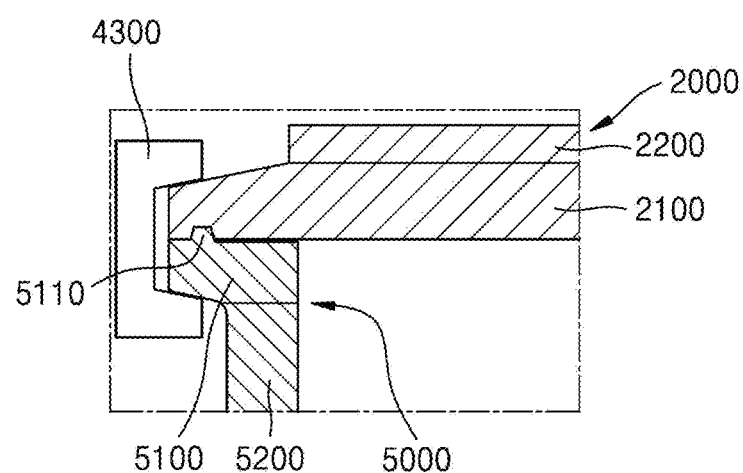
FIG. 11 is a view schematically illustrating the fastening of an upper ring, an upper ring support, and the clamp portion according to one embodiment of the present invention.

FIG. 11 is a view schematically illustrating fastening of the upper ring 2000, the upper ring support 5000, and the clamp portion 4000 according to one embodiment of the present invention.

According to one embodiment of the present invention, the upper end flange 5100 of the upper ring support 5000 may include a plurality of flange protrusions 5110 formed on a rim region thereof and protruding in a height direction. In addition, according to one embodiment of the present invention, the upper ring 2000 may include a plurality of protrusion accommodating portions formed on a rim region of the lower surface thereof and formed in a region facing the plurality of flange protrusions 5110. As illustrated in FIG. 11, the upper ring 2000 is preferably coupled such that the plurality of flange protrusions 5110 and the plurality of protrusion accommodating portions are accommodated.

Meanwhile, the plurality of flange protrusions 5110 may have a trapezoidal cross-section as illustrated in FIG. 11, and the plurality of protrusion accommodating portions may have a shape capable of complementarily accommodating the plurality of flange protrusions 5110.

With such a configuration, the upper ring 2000 may be fixed at accurate position when supported by the upper ring support 5000.

That is, according to one embodiment, the plurality of flange protrusions 5110 may be formed on the upper surface of the upper end flange 5100, and the plurality of protrusion accommodating portions are formed on the lower surface of the upper ring 2000, thereby exhibiting an effect of precisely and more firmly fixing the upper ring 2000 to the upper end flange 5100.

According to one embodiment of the present invention, the separation adapter may connect and separate the upper ring to and from the lower ring through a simple process of controlling the fastening between the plurality of clamp portions and the rim of the upper ring, so that it may be easy to connect the payload to the projectile and separate the payload from the projectile.

According to one embodiment of the present invention, the separation adapter applies a ring-synchronized separation structure for simultaneously releasing a fastening state between the plurality of segmented clamp portions and the upper ring, only by rotating the drive member, so that it is possible to achieve safety and improve accuracy in separation of the payload as compared to an adapter to which the conventional explosive separation structure is applied.

According to one embodiment of the present invention, as compared to the conventional explosive separation adapter, the separation adapter of the present invention does not cause breakage due to explosion in a process of connecting the payload to the projectile and a process of separating the payload from the projectile, so that it is possible to reuse the separation adapter.

According to one embodiment of the present invention, the ring guide portion ensures a stable rotational movement and an accurate alignment of the drive member, so that it is possible to improve the operational stability of the payload separation structure.

According to one embodiment of the present invention, since the torsion of the torsion spring portion may be adjusted through an operation of simply rotating the torsion adjusting portion, so that it is possible to control the torsion even without replacing the torsion spring portion.

According to one embodiment of the present invention, the plurality of kick-off modules may assist the upper ring to be separated upward from the lower ring by applying a tensile force to the upper ring in the upward direction, so that it is possible to improve accuracy of separation of the payload.

According to one embodiment of the present invention, a plurality of flange protrusions are formed on the upper surface of the upper end flange, and a plurality of protrusion accommodating portions are formed on the lower surface of the upper ring, so that it is possible to more precisely and firmly fix the upper ring to the upper end flange.

The descriptions of the embodiments set forth herein are provided to enable any person having ordinary skill in the art to use or implement the present invention. It will be apparent to a person having ordinary skill in the art that various modifications can be made to the embodiments, and general principles defined herein may be applied to other embodiments without departing from the scope of the present invention. Accordingly, the present invention is not limited to the embodiments set forth herein, but is to be construed in the broadest scope consistent with the principles and novel features set forth herein.

What is claimed is:

1. A separation adapter for separating a payload from a projectile in a space environment, the separation adapter comprising:
    a lower ring coupled to the projectile;
    an upper ring coupled to the payload;
    a drive member rotatably coupled to an upper surface of the lower ring along a rim of the lower ring; and
    a plurality of clamp portions, each of which is fixed to the upper surface of the lower ring and located inward of the drive member, and in which a part of the drive member makes contact with an outside of the clamp portion and a rim of the upper ring is fastened to an inside of the clamp portion,
    wherein as the drive member rotates, the plurality of clamp portions are simultaneously switched from a first state to a second state,
    the first state is a state in which a force is applied to each of the clamp portions in an inward direction of the lower ring by the part of the drive member, and
    the second state is a state in which the force applied to each of the clamp portions in the inward direction of the lower ring is released by the part of the drive member.

2. The separation adapter of claim 1, wherein in a state where the rim of the upper ring is fastened to the inside of the plurality of clamp portions, the drive member rotates along the rim of the lower ring, so that the part of the drive member moves along the rim of the lower ring,
    the part of the drive member moves along the rim of the lower ring, so that the plurality of clamp portions are simultaneously switched from the first state to the second state, and
    the plurality of clamp portions are simultaneously switched from the first state to the second state so that fastening between the plurality of clamp portions and the rim of the upper ring is released and the upper ring is separated from the lower ring.

3. The separation adapter of claim 1, wherein the drive member includes:
    a plurality of stoppers, each of which protrudes in a height direction from an upper surface of the drive member, and has an inclined surface formed on an upper side thereof as a height of the stopper gradually decreases from one side to the other side,
    when the plurality of clamp portions are in the first state, a part of each of the clamp portions makes contact with one side of the inclined surface of each of the stoppers, and
    when the plurality of clamp portions are in the second state, the part of each of the clamp portions makes contact with the other side of the inclined surface of each of the stoppers.

4. The separation adapter of claim 1, wherein each of the clamp portions includes:
    a clamp holder portion fixed to the upper surface of the lower ring;
    a clamp body portion having a lower portion rotatably coupled to the clamp holder portion about a shaft in which the part of the drive member makes contact with an outer portion of the clamp body portion; and
    a clamp fastening portion coupled to an inner upper portion of the clamp body portion and including a fastening groove portion which is concavely recessed such that the rim of the upper ring is fastened thereto.

5. The separation adapter of claim 4, wherein the clamp body portion further includes:
    a contact protruding portion protruding in a direction perpendicular to an outer surface of the clamp body portion, and having a cylindrical shape so that an outer circumferential surface of the contact protruding portion makes line-contact with the part of the drive member.

6. The separation adapter of claim 4, wherein each of the clamp portions further includes: a torsion spring portion disposed inside the clamp holder portion, having one end connected to the lower portion of the clamp body portion, and configured to apply a force to the clamp body portion in the outward direction of the lower ring,
    when the plurality of clamp portions are in the first state, the clamp body portion is applied with a force in the inward direction of the lower ring by the part of the drive member, and
    when the plurality of clamp portions are in the second state, the clamp body portion is widened in the outward direction of the lower ring by the torsion spring portion.

7. The separation adapter of claim 6, wherein the clamp holder portion further includes torsion adjusting portions rotatably disposed at both end sides of the clamp holder portion about a shaft, respectively, in which one side of the torsion adjusting portion is exposed to an outside of the clamp holder portion and the other side of the torsion adjusting portion is connected to the other end of the torsion spring portion, and as the torsion adjusting portion rotates about a shaft, the other end of the torsion spring portion rotates, and as the other end of the torsion spring portion rotates, a torsion of the torsion spring portion is adjusted.

8. The separation adapter of claim 1, further comprising a ring guide portion configured to guide the drive member such that the drive member rotates along the rim of the lower ring, wherein the ring guide portion includes:

a vertical ring guide portion including a plurality of first ring guides, each of which has a roll shape as a whole, is rotatably connected to the upper surface of the lower ring about a shaft, and makes contact with an inner circumferential surface of the drive member; and a horizontal guide portion including: a plurality of guide fixing members, each of which has a block shape as a whole, is disposed on the upper surface of the lower ring, and located inward of the drive member; and a plurality of second ring guides, each of which is rotatably connected to the outer surface of each of the plurality of guide fixing members about a shaft and makes contract with the upper surface of the drive member.

9. The separation adapter of claim 1, further comprising an upper ring support configured to support the upper ring, wherein the upper ring support includes:

an upper end flange having a shape corresponding to the lower surface of the upper ring as a whole;

a flange fixing portion coupled to the upper surface of the lower ring while extending downward from the upper end flange; and a module accommodating portion coupled to the upper surface of the lower ring while extending downward from the upper end flange, and forming an internal space.

10. The separation adapter of claim 1, further comprising a plurality of kick-off modules configured to transmit a force to the lower surface of the upper ring in an upward direction, wherein each of the kick-off modules includes:

a kick-off column portion having a column shape as a whole and having a lower end fixed to the upper surface of the lower ring;

a kick-off tube portion including: a tube body having a hollow tube shape as a whole and configured to accommodate the kick-off column portion therein; a tube flange coupled to an upper side of the tube body and having a diameter greater than a diameter of the tube body as a whole; and a contact sensor coupled to an upper side of the tube flange; and a compression spring configured to surround an outer circumferential surface of the kick-off tube portion, when the plurality of clamp portions are in the first state, the compression spring is compressed downward by the upper ring, and when the plurality of clamp portions are in the second state, the compression spring applies a force to the upper ring in the upward direction.

* * * * *